United States Patent [19]

Hirose et al.

[11] Patent Number: 5,034,442
[45] Date of Patent: Jul. 23, 1991

[54] FLAME RETARDANT AND FLAME RETARDANT RESIN COMPOSITION

[75] Inventors: Toru Hirose, Shido; Shigeo Miyata, Takamatsu, both of Japan

[73] Assignee: Kyowa Chemical Industry Co., Ltd., Kagawa, Japan

[21] Appl. No.: 394,418

[22] Filed: Aug. 16, 1989

[30] Foreign Application Priority Data

Aug. 19, 1988 [JP] Japan .................. 63-206170

[51] Int. Cl.$^5$ ............................ C08K 5/521
[52] U.S. Cl. .................. 524/145; 252/602; 252/609; 524/436
[58] Field of Search ........... 524/911, 912, 436, 140, 524/145, 138, 136; 106/462, 503; 252/609, 602; 260/501.12, 501.19

[56] References Cited

U.S. PATENT DOCUMENTS

| | | | |
|---|---|---|---|
| 3,247,134 | 4/1966 | Hwa et al. | 524/145 |
| 4,098,762 | 7/1978 | Miyata et al. | 524/436 |
| 4,126,593 | 11/1978 | Takahashi | 524/436 |
| 4,251,436 | 2/1981 | Silberberg et al. | 524/145 |
| 4,721,746 | 1/1988 | Tashiro | 524/145 |
| 4,761,188 | 8/1988 | Miyata et al. | 524/145 |
| 4,851,463 | 7/1989 | Opsahl | 524/436 |

FOREIGN PATENT DOCUMENTS

| | | |
|---|---|---|
| 073343 | 9/1983 | European Pat. Off. |
| 0131358 | 1/1985 | European Pat. Off. |
| 2360405 | 6/1974 | Fed. Rep. of Germany |
| 61-240507 | 10/1986 | Japan |
| 63-230518 | 9/1988 | Japan |

Primary Examiner—Veronica P. Hoke
Attorney, Agent, or Firm—Wenderoth, Lind & Ponack

[57] ABSTRACT

A flame retardant produced by surface-treating magnesium hydroxide with a dialcohol amine salt of an alcohol phosphate ester represented by formula (1)

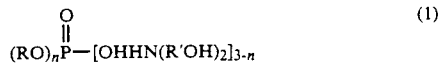

wherein R represents an alkyl, alkenyl group or aralkyl having 10 to 30 carbon atoms, R' represents an alkylene group having 1 to 6 carbon atoms and n represents 1 or 2, and/or an alcohol phosphate ester or an alkali metal salt thereof represented by formula (2)

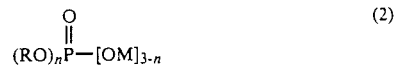

wherein R and n represent the same meanings as in formula (1) and M represents an alkali metal and/or hydrogen, provided that when n=1, each of two M's may independently represent an alkali metal or hydrogen.

and a resin composition containing the above flame retardant.

4 Claims, No Drawings

FLAME RETARDANT AND FLAME RETARDANT RESIN COMPOSITION

FIELD OF THE INVENTION

The present invention relates to a flame retardant and a flame retardant resin composition which contains the flame retardant and has excellent resistance to water and acid. More specifically, it relates to a flame retardant produced by surface-treating magnesium hydroxide with an alcohol phosphate ester or a dialcohol amine salt or alkali metal salt of an alcohol phosphate ester, and a flame retardant resin composition containing the flame retardant.

PRIOR ART OF THE INVENTION

Synthetic resin flame retardants comprising an organohalogen compound or an organohalogen compound and antimony trioxide in combination, i.e. so-called halogen-based synthetic resin flame retardants, have caused a social problem, since they emit large amounts of smoke and toxic gas at the time of combustion. For this reason, it has been desired to develop a nontoxic flame retardant containing no halogen, and studies thereof have been being made hard. As a result, magnesium hydroxide has been gaining a firm evaluation as the most effective flame retardant.

That is not only because, like aluminum hydroxide, magnesium hydroxide incorporated into a resin emits only a small amount of smoke and is nontoxic at the time of combustion, but also because, unlike aluminum hydroxide, the magnesium hydroxide does not foam a molded product of a resin by undergoing partial dehydration of itself at a temperature for processing the resin. Hence, synthetic resins into which a magnesium hydroxide-containing flame retardant is incorporated in high concentrations are now being dominantly used in electric cables in a nuclear power plant, ship, marine oil field, subway, etc., communication-use cables, household appliances, office-use devices, automobiles, and the like.

However, it has now been understood that magnesium hydroxide causes the following problems: when the above products are exposed to water containing carbonic acid, acid rain, etc., for a long period of time, magnesium dissolved in an acid is deposited on the surfaces of the products in the form, e.g. of magnesium carbonate, basic magnesium sulfate, or the like, to whiten the surfaces or impair the appearances of molded articles, and at the same time, magnesium hydroxide existing in the resin gradually migrates onto the surface of a molded article to degrade the imparted flame retarding ability of the molded article. There is also a proposal of a flame retardant produced by surface-treating magnesium hydroxide with a high fatty acid or a salt thereof, or silane or titanium coupling agent. This flame retardant has an effect on improvement of resistance to water and acid to some extent. At present, however, the above problems have not yet been solved by this flame retardant.

SUMMARY OF THE INVENTION

It is an object of the present invention to solve the above problems and provide a flame retardant which neither impairs the appearance of a molded article nor causes degradation of the flame retarding ability even when the molded article is exposed to water containing carbonic acid, acid rain, etc., for a long period of time, and a synthetic resin composition containig said flame retardant and having excellent resistance to water and acid.

It is another object of the present invention to provide a synthetic resin composition having excellent moldability and mechanical strength.

The flame retardant of the present invention is produced by surface-treating magnesium hydroxide with a dialcohol amine salt of an alcohol phosphate ester represented by formula (1)

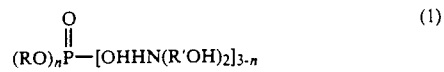

wherein R represents an alkyl, alkenyl or aralkyl group having 10 to 30 carbon atoms, R' represents an alkylene group having 1 to 6 carbon atoms and n represents 1 or 2, and/or an alkali metal salt of an alcohol phosphate ester represented by formula (2)

wherein R represents the same meaning as in formula (1) and M represents an alkali metal and/or hydrogen, provided that when $n=1$, each of two M's may independently represent an alkali metal or hydrogen.

Further, the present invention provides a flame retardant resin composition produced by incorporating 10 to 250 parts by weight of the above flame retardant to 100 parts by weight of a synthetic resin.

DESCRIPTION OF THE INVENTION

In the present invention, as a dialcohol amine salt of an alcohol phosphate ester represented by the above formula (1) and/or an alcohol phosphate ester or alkali metal salt of an alcohol phosphate ester represented by the above formula (2) (both to be referred to as "surface treating agent" hereinbelow), compounds included in the above formula (1) or (2) may be used alone or in combination. In formula (2), the alkali metal stands for Li, Na, K, Rb, or the like.

In general, with the increasing number of carbon atoms in R of the above formula (1) or (2), a flame retardant obtained tends to have better resistance to water and acid, and said number of carbon atoms is preferably not less than 15. Further, a diester tends to exhibit better resistance to water and acid than a monoester. The number of carbon atoms, etc., may be selected suitably depending upon use.

The amount of the surface treating agent for use in surface treatment of magnesium hydroxide is 0.5 to 10% by weight, preferably 1 to 5% by weight, based on the magnesium hydroxide. When the amount of the surface treating agent is smaller than the above lower limit, the effect on improvement of resistance to water and acid is insufficient. And even when the amount of the surface treating agent is larger than the above upper limit, the effect on improvement of resistance to water and acid cannot be further enhanced, and the use of the surface treating agent in a larger amount than the above upper limit decreases mechanical strength such as tensile strength, IzOd impact strength, etc., and flame retarding ability of a molded article obtained from a synthetic resin composition into which the flame retardant is incorporated.

The surface-treatment of magnesium hydroxide with the surface treating agent is carried out by adding a solution or an emulsion of the surface treating agent in water to a suspension of magnesium hydroxide in water with stirring while maintaining the suspension at a temperature at which the surface treating agent is dissolved, and mixing these two components sufficiently.

It is considered that the surface treating agent exhibits strong resistance to water and acid on the basis of the following mechanism.

The surface treating agent is dissociated in a water medium to form,

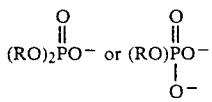

bonds to magnesium forming the surface of magnesium hydroxide and covers the surface, with its lipophilic RO group projecting from the surface. When the surface treating agent is added to magnesium hydroxide, in general, the amount of the surface treating agent which bonds is about 70 to 90% based on the amount of that which is added in the case of a dialcohol amine salt, and it is about 95% in the case of an alkali metal salt.

A slurry of the surface-treated magnesium hydroxide is thereafter dehydrated, dried and pulverized, or dehydrated, granulated and dried to bring it into a state in which the surface-treated magnesium hydroxide can be incorporated into a resin.

In a magnesium hydroxide used in the present invention, it is preferable that its crystals are well grown and it has less aggregation, since such a magnesium hydroxide exhibits excellent moldability, mechanical strength and flame retarding ability. That is, such a magnesium hydroxide has a BET specific surface area in the range of from 1 to 20 m$^2$/g, particularly preferably in the range of 1 to 10 m$^2$/g, and an average secondary particle diameter in the range of from 0.2 to 5 $\mu$m, particularly preferably in the range of from 0.5 to 3 $\mu$m. When the BET specific surface area exceeds the above upper limit, a resin into which the resultant flame retardant is incorporated shows a decrease in moldability, mechanical strength, resistance to water and acid, etc., and when the BET specific surface area is smaller than the above lower limit, the flame retarding ability, tensile strength, etc., are degraded. Further, when the average secondary particle diameter is smaller than the above lower limit, a resin into which the resultant flame retardant is incorporated shows a decrease in moldability, mechanical strength, resistance to water and acid, etc., and when it is larger than the above upper limit, the flame retarding ability, tensile strength, etc., are degraded.

In the flame retardant resin composition of the present invention, usable are any moldable resins which can be processed.

Examples of such resins include olefin polymers and copolymers such as polyethylene, polypropylene, polybutene-1, poly 4-methylpentene-1, ethylene/propylene copolymer, ethylene/butene-1 copolymer, ethylene/4-methylpentene-1 copolymer, propylene/butene-1 copolymer, propylene/4-methylpentene-1 copolymer and ethylene/propylene/diene copolymer, and chlorination products of these; styrene polymers and copolymers such as polystyrene, acrylonitrile/butadiene/styrene copolymer, acrylonitrile/acrylic styrene copolymer, acrylonitrile/EPDM (ethylene/propylene/diene terpolymer)/styrene copolymer, acrylonitrile/styrene coopolymer, etc.; vinyl chloride or vinyl acetate-type polymers or copolymers such as vinyl chloride resin, vinyl acetate resin, vinylidene chloride resin, ethylene/vinyl chloride copolymer, ethylene/vinyl acetate copolymer, and post-chlorinated vinyl chloride resin, and chlorination products of these; phenoxy resin; butadiene resin, fluorine resin; polyacetal resin; polyamide resin; polyallylate resin; polyurethane resin; polyesters such as polyethylene terephthalate, polybutylene terephthalate, etc.; polycarbonate resin; polysulfone resin; polyphenylene oxide resin; thermoplastic resins such as methacrylic resin, etc.; thermosetting resins such as diallylphthalate resin, vinyl ester resin, phenolic resin, unsaturated polyester resin, polyurethane resin, melamine resin, urea resin, etc.; and rubbers such as styrene/butadiene rubber, polybutadiene rubber, isoprene rubber, ethylene/propylene copolymer, ethylene propylene diene terpolymer, nitrile butadiene rubber, chloroprene rubber, isobutylene-isoprene rubber, fluorine rubber, acrylic rubber, chlorosulfonated polyethylene rubber, epichlorohydrin rubber.

The flame retardant resin composition of the present invention contains 100 parts by weight of the above resin and about 10 to 250 parts by weight of magnesium hydroxide surface-treated with the surface treating agent.

In addition to the above-mentioned components, the flame retardant resin composition of the present invention may contain some other customarily usable additives. As examples of such additives, it is possible to cite an antioxidant, UV ray-absorbing agent, antistatic agent, lubricant, pigment, foaming agent, plasticizer, reinforcing agent, organohalogen flame retardant, carbon black, tin and tin compound, flame retarding auxiliary such as red phosphorus, crosslinking agent, and the like.

The flame retardant resin composition of the present invention can be produced by an ordinary kneading method using a roll, Bambury mixer, kneader, single-screw extruder, twin-screw extruder, etc.

According to the present invention, there is provided a flame retardant which emits only a small amount of smoke when combusted and which is nontoxic.

According to the present invention, there is provided a flame retardant which can give a flame retardant resin composition which neither impairs the appearance of a molded article therefrom nor decreases the flame retarding ability even if the molded article is exposed to carbonic acid-containing water, acid rain, etc., for a long period of time.

According to the present invention, there is provided a flame retardant resin composition which is excellent in moldability and which can give a flame retardant molded article having excellent mechanical strength.

The present invention will be explained hereinbelow more in detail by reference to Examples. Methods for measurement of BET specific surface area, etc., are as follows.

BET specific surface area: measured according to a liquid nitrogen adsorption method.

Average secondary particle diameter: measured by using a microtrack (made by Nikkiso K. K.) after a slurry of 1% by weight of magnesium hydroxide in water was treated with an ultrasonic wave for three minutes.

Resistance to water and acid: two test pieces having a size of 127×13×3.2 mm were immersed in 500 ml of deionized water, carbonic acid gas was then blown in continuously for 48 hours, and then Mg ions dissolved out in the water was quantitatively measured by atomic-absorption spectroscopy. pH of the water was also measured.

Tensile strength: measured according to JIS K6758.

Notched Izod impact strength: measured according to JIS K7110.

Flame retarding ability: measured on a test piece having a thickness of ⅛ inch according to UL 94.

In the following examples, "%" and "part" stand for "% by weight" and "part by weight" unless otherwise specified.

EXAMPLE 1

A magnesium hydroxide (BET specific surface area: 8 m²/g, average secondary particle diameter: 0.9 μm, 2 kg) was uniformly dispersed in 10 l of water by using a chemistirrer, and the dispersion was warmed to 80° C. Separately, 40' g (corresponding to 2% based on magnesium hydroxide) of diethanol amine salt of dioleyl alcohol phosphate ester

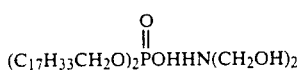

was dissolved in 1 l of warm water at 80° C. This solution was added to the above magnesium hydroxide slurry, and the mixture was fully and continuously stirred to carry out surface treatment. Then, the surface-treated magnesium hydroxide was dehydrated under reduced pressure, dried and pulverized.

135 parts of the surface-treated magnesium hydroxide and 100 parts of polypropylene were mixed, and then the mixture was melted and kneaded in an extruder at 220° C. to prepare pellets. These pellets were injection-molded at 220° C. by using an injection molding machine to prepare test pieces.

These test pieces were measured for resistance to water, resistance to acid, flame retarding ability, tensile strength, and notched Izod impact strength. Table 1 shows the results of the measurements.

EXAMPLES 2-4 and COMPARATIVE EXAMPLES 1-3

Example 1 was repeated except that the amount of the surface treating agent relative to that of magnesium hydroxide was changed as shown in Table 1. Table 1 shows the results.

COMPARATIVE EXAMPLE 4

Example 1 was repeated except that 2%, based on magnesium hydroxide, of sodium oleate was used in place of the surface treating agent used in Example 1. Table 1 shows the results.

EXAMPLES 5-8

Example 1 was repeated except that 3%, based on magnesium hydroxide, of the following surface treating agent was used in place of the surface treating agent used in Example 1. Table 1 shows the results.

Example 5—Sodium salt of lauryl alcohol phosphate ester;

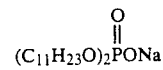

Example 6—Diethanol amine salt of stearyl alcohol phosphate ester; a mixture of 90% of a diester of

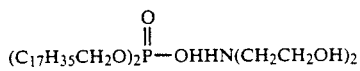

and 10% of a monoester of

Example 7—Sodium salt of erucyl alcohol phosphate ester;

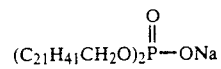

Example 8—Diethanol amine salt of aralkyl alcohol phosphate ester

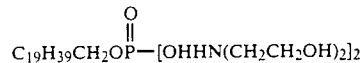

EXAMPLE 9

A distearyl alcohol phosphate ester (60 g, corresponding to 3% based on magnesium hydroxide) represented by formula

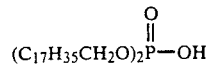

was added to 2 l of warm water at 80° C., and 1.5 g of sodium hydroxide as an emulsion auxiliary was added thereto. The mixture was stirred sufficiently with a chemistirrer to prepare a homogeneous emulsion. By using this surface-treating agent, Example 1 was repeated. Table 1 shows the results.

In Table 1, A stands for diethanol amine salt of oleyl alcohol phosphate ester, B stands for sodium oleate, C stands for sodium salt of lauryl alcohol phosphate ester, D stands for diethanol amine salt of stearyl alcohol phosphate ester, E stands for sodium salt of erucyl alcohol phosphate ester, F stands for diethanol amine salt of aralkyl alcohol phosphate ester, and G stands for distearyl alcohol phosphate ester.

TABLE 1

| Ex or CEx | Surface treating agent kind | Surface treating agent Addition amnt (%) | Surface treating agent Bonding amnt (%) | Resistance to water and acid Dissolved Mg (ppm) | Resistance to water and acid pH | Flame retarding ability | Tensile strength (kg·f/cm$^2$) | Izod impact strength (kg·cm/cm) |
|---|---|---|---|---|---|---|---|---|
| Ex-1 | A | 2 | 1.6 | 8.1 | 4.51 | V-0 | 209 | 9.5 |
| Ex-2 | A | 1 | 0.82 | 16.5 | 4.82 | V-0 | 224 | 7.0 |
| Ex-3 | A | 3 | 2.4 | 6.5 | 4.50 | V-0 | 203 | 17.5 |
| Ex-4 | A | 5 | 4.1 | 6.3 | 4.49 | V-0 | 200 | 15.1 |
| CEx-1 | — | 0 | — | 680 | 6.25 | V-1 | 185 | 2.7 |
| CEx-2 | A | 0.2 | 0.08 | 101 | 5.63 | V-0 | 190 | 3.5 |
| CEx-3 | A | 15 | 11.8 | 6.7 | 4.51 | V-1 | 183 | 8.6 |
| CEx-4 | B | 2 | 1.8 | 169 | 5.73 | V-0 | 211 | 17.9 |
| Ex-5 | C | 3 | 2.7 | 12.2 | 4.70 | V-0 | 201 | 15.0 |
| Ex-6 | D | 3 | 2.3 | 2.0 | 4.15 | V-0 | 200 | 15.7 |
| Ex-7 | E | 3 | 2.8 | 4.9 | 4.42 | V-0 | 205 | 18.3 |
| Ex-8 | F | 3 | 2.0 | 1.8 | 4.14 | V-0 | 197 | 9.3 |
| Ex-9 | G | 3 | 2.7 | 2.1 | 4.17 | V-0 | 206 | 15.0 |

What is claimed is:

1. A flame retardant produced by surface-treating magnesium hydroxide with a dialcohol amine salt of an alcohol phosphate ester represented by formula (1)

$$(RO)_n P(=O)-[OHHN(R'OH)_2]_{3-n} \quad (1)$$

wherein R represents an alkyl, alkenyl or aralkyl group having 10 to 30 carbon atoms, R' represents an alkylene group having 1 to 6 carbon atoms and n represents 1 or 2, and/or an alcohol phosphate ester or an alkali metal salt thereof represented by formula (2)

$$(RO)_n P(=O)-[OM]_{3-n} \quad (2)$$

wherein R and n represent the same meanings as in formula (1) and M represents an alkali metal and/or hydrogen, provided that when n=1, each of two M's may independently represent an alkali metal or hydrogen, and wherein the magnesium hydroxide is surface-treated by adding 0.5 to 10% by weight of a dialcohol amine salt of an alcohol phosphate ester represented by formula (1) and/or an alcohol phosphate ester or an alkali metal salt of an alcohol phosphate ester represented by formula (2).

2. A flame retardant according to claim 1 wherein R in each of formulae (1) and (2) represents an alkyl, alkenyl or aralkyl group having 15 to 30 carbon atoms.

3. A flame retardant according to claim 1 wherein the magnesium hydroxide has a BET specific surface area of 1 to 20 m$^2$/g and an average secondary particle diameter of 0.2 to 5 μm.

4. A flame retardant resin composition comprising 100 parts by weight of a synthetic resin and 10 to 250 parts by weight of the flame retardant recited in claim 1.

* * * * *